June 17, 1952  M. F. MURRAY  2,600,673
FISHING LURE
Filed Dec. 29, 1947
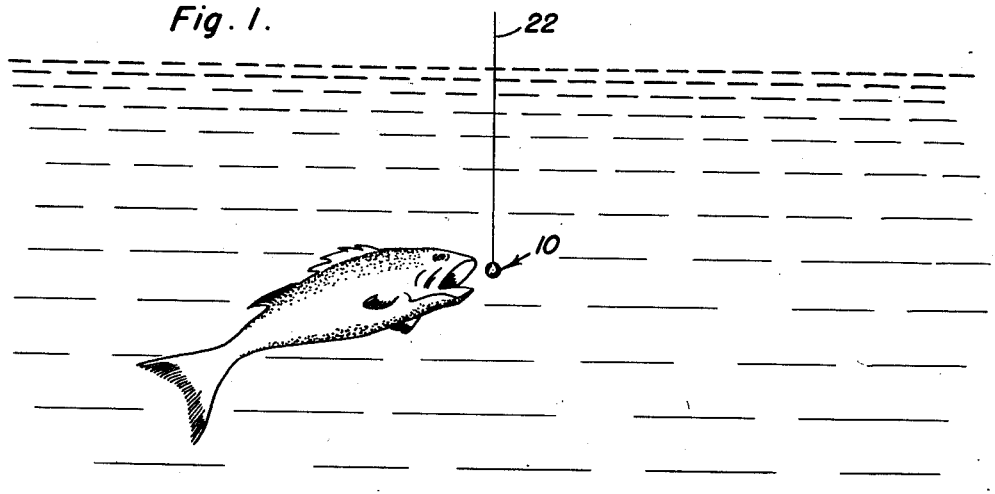
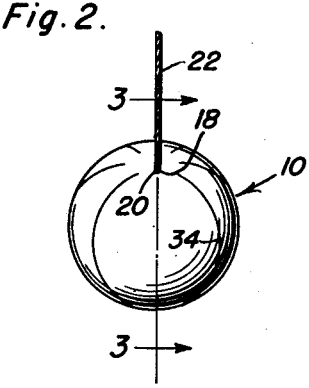
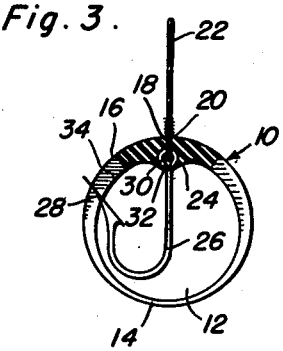
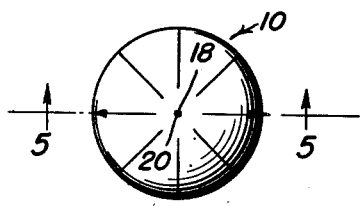
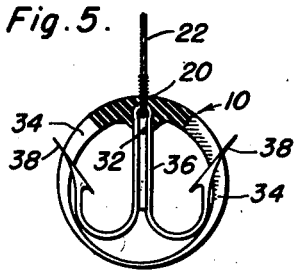
Michael F. Murray
INVENTOR.

Patented June 17, 1952

2,600,673

UNITED STATES PATENT OFFICE 2,600,673

FISHING LURE

Michael F. Murray, Springfield, Oreg., assignor of thirty per cent to Glenn A. Strawn, Springfield, Oreg., and forty per cent to Melvin L. Gans, Springfield, Oreg.

Application December 29, 1947, Serial No. 794,345

4 Claims. (Cl. 43—42.1)

This invention relates to new and useful improvements in fishing lures and the primary object of the present invention is to provide a fishing lure including a resilient, hollow body supporting a hook therein for engaging a fish as the said fish strikes at the body.

Another important object of the present invention is to provide a fishing lure so designed as to house a hook in such a manner that only the pointed extremity of a hook protrudes therefrom until such time as a fish strikes the lure to to collapse the body and become engaged by the pointed extremity of the hook.

A further object of the present invention is to provide a fishing device that is small and compact in structure, and which resembles a fish egg to greatly attract certain types of fish thereto, such as trout.

A still further aim of the present invention is to provide a fishing device that is simple and practical in construction, strong and reliable in use, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a diagrammatic view showing the present invention disposed within a fluid medium;

Figure 2 is a perspective view of the present fishing lure applied to a fishing line (shown in part);

Figure 3 is a vertical sectional view taken substantially on the plane of section line 3—3 of Figure 2;

Figure 4 is a top plan view of the present fishing lure; and

Figure 5 is a horizontal sectional view taken substantially on the plane of section line 5—5 of Figure 4, showing a gang of hooks disposed within the said lure.

Referring now to the drawings in detail, wherein for the purpose of illustration, there is disclosed a preferred embodiment of the present invention, the numeral 10 represents a spherical body preferably of resilient material, however, the same will function efficiently if of a flexible material such as cloth. This body 10 is provided with an eccentric, generally spheroidal aperture or chamber 12, so that the lower wall 14 of the body will be of a reduced thickness than the upper wall 16.

Extending through an axial opening 18 in the upper wall 16 of the body 10 is one end 20 of a fishing line 22 which is fixed to the eye end 24 of a fishing hook 26 having a pointed extremity 28. It should be noted that a rounded shoulder 30 integrally formed with the body projects downwardly from the upper wall 16 into the chamber 12 and is provided with a suitable slot or slit 32 for frictionally engaging the eye end 24 of the hook, as shown best in Figure 3 of the drawings, so that the pointed end 28 of the hook will extend through one of the circumferentially spaced, arcuate slits 34 provided in the body 10.

In practical use of the device, the spherical body is of such a size as to resemble or simulate a fish egg which affords a great attraction for certain types of fish, such as trout. When the body 10 is lowered into a fluid medium, as shown in Figure 1, and a fish strikes at the same, the body 10 will collapse, due to the slits 34 therein and the fish will be hooked on the pointed end of the hook. The lower wall of the body being of a reduced thickness than the upper wall of the body, will cause the body to be collapsed at its lower portion more easily than the upper portion, as a fish will usually strike at the lower end in an upward direction. Furthermore, the uneven or eccentric balance of the body will cause the same to wobble when pulled through a fluid medium to attract fish thereto.

Obviously, the body 10 may be constructed of a floatable material so that the same will float upon the surface of a fluid medium to attract fish swimming near the water surface, however, it has been observed that the best results can be obtained if the body is suspended in a fluid medium as illustrated in Figure 1 of the drawings.

Figure 5 shows the hook 26 replaced by a U-shaped wire member 36 whose ends terminate in points or barbs 38. The barbs 38 will extend through a pair of slits 34 provided in the body 10.

In view of the foregoing description taken in conjunction with the accompanying drawings it is believed that a clear understanding of the device will be quite apparent to those skilled in this art. A more detailed description is accordingly deemed unnecessary It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing device comprising a spherical body of resilient material with upper and lower hemispherical walls and having an eccentric generally spherical chamber therein, the lower hemispherical wall of the body being of a thickness less than the thickness of the upper hemispherical wall of said body, a hook housed in said body and having a pointed end, said body having a slit therein, the pointed end of said hook received in said slit, and means for holding the hook against rotation relative to said body to retain the pointed end of said hook in said slit.

2. The combination of claim 1 wherein said means includes a shoulder integrally formed with the upper hemispherical wall of said body and extending into said chamber, said shoulder having a slot yieldingly receiving the shank of the hook.

3. A fishing device comprising a spherical body of resilient material having upper and lower walls, said body also having a generally spheroidal chamber therein disposed eccentrically with respect to the center of said body whereby the upper wall of said body is of a thickness greater than the thickness of the lower wall of said body to cause the body to wobble when pulled through a fluid medium, a shoulder integrally formed with the upper wall of said body and disposed within said chamber, and a hook having a shank portion and also having a pointed end, said shoulder having a slot yieldingly receiving the shank of said hook, said body having a slit receiving the pointed end of said hook.

4. A fishing device comprising a spherical body of resilient material having first and second diametrically opposed hemispherical walls, said body also having a generally spheroidal chamber therein offset relative to the center of the body whereby the thickness of said second wall is greater than the thickness of said first wall to cause the body to wobble when pulled through a fluid medium, and a hook received in said body, said body having a slit receiving the pointed end of said hook.

MICHAEL F. MURRAY.

REFERENCES CITED

The following references are of record in the file of this patent:

UNITED STATES PATENTS

| Number | Name | Date |
|---|---|---|
| 890,549 | Zamel | June 9, 1908 |
| 1,689,027 | Helle | Oct. 23, 1928 |
| 2,241,367 | Sarff | May 6, 1941 |
| 2,261,068 | Mackovich | Oct. 28, 1941 |
| 2,306,181 | Neumann | Dec. 22, 1942 |

FOREIGN PATENTS

| Number | Country | Date |
|---|---|---|
| 811,570 | France | Jan. 18, 1937 |